US008635275B2

(12) United States Patent
 Glynn et al.

(10) Patent No.: US 8,635,275 B2
(45) Date of Patent: Jan. 21, 2014

(54) SESSION APPLICATION RECORDS

(75) Inventors: Fergal Glynn, Medford, MA (US);
 Brian Silver, North Reading, MA (US);
 Richard W. Shea, Maynard, MA (US);
 Ken Ouellette, Boxborough, MA (US);
 Vinh Huu Tran, North Andover, MA (US); Justin W. Haddad, Merrimack, NH (US)

(73) Assignee: Aspect Software, Inc., Lombard, IL (US)

( * ) Notice: Subject to any disclaimer, the term of this patent is extended or adjusted under 35 U.S.C. 154(b) by 1468 days.

(21) Appl. No.: 11/890,010

(22) Filed: Aug. 2, 2007

(65) Prior Publication Data

US 2008/0034373 A1 Feb. 7, 2008

Related U.S. Application Data

(60) Provisional application No. 60/835,378, filed on Aug. 3, 2006.

(51) Int. Cl.
 *G06F 15/16* (2006.01)

(52) U.S. Cl.
 USPC ............................ 709/204; 719/312; 719/328

(58) Field of Classification Search
 USPC .................................. 709/204; 719/312, 328
 See application file for complete search history.

(56) References Cited

U.S. PATENT DOCUMENTS

| 6,484,174 | B1 * | 11/2002 | Wall et al. ............................. 1/1 |
| 6,570,969 | B1 * | 5/2003 | Albal et al. ................... 379/126 |
| 6,611,867 | B1 * | 8/2003 | Bowman-Amuah .......... 709/224 |
| 7,221,660 | B1 * | 5/2007 | Simonson et al. ............ 370/312 |
| 2003/0007496 | A1 * | 1/2003 | Brown et al. ................. 370/401 |
| 2003/0212809 | A1 * | 11/2003 | Wu et al. ........................ 709/231 |
| 2005/0287983 | A1 | 12/2005 | Armanino et al. |
| 2006/0062208 | A1 | 3/2006 | Li et al. |
| 2007/0280435 | A1 * | 12/2007 | Smith ........................... 379/67.1 |

FOREIGN PATENT DOCUMENTS

EP      1249986 A2      10/2002

OTHER PUBLICATIONS

International Search Report for Application No. PCT/US2007/017381, dated Mar. 12, 2008.

* cited by examiner

*Primary Examiner* — Thomas Dailey
(74) *Attorney, Agent, or Firm* — Husch Blackwell LLP

(57) ABSTRACT

Some embodiments of the present invention provide a method and system for correlating information regarding an interactive communication. A session application record is provided to store information of a session that represents an interactive communication that is at least between two endpoints. An application programming interface (API) is provided for users to create and manipulate session application records. Application specific data or customized data can be stored with the session application record using a tag that includes a name and value pair. One session application record can be associated with another session application record by using a relation. Any information that is gathered during a session can be accessible even when one of the endpoints is replaced by another endpoint.

19 Claims, 5 Drawing Sheets

SESSION APPLICATION RECORDS

RELATED APPLICATION

This application claims priority to U.S. Provisional Patent Application Ser. No. 60/835,378, filed Aug. 3, 2006, the contents of which are hereby incorporated by reference.

FIELD OF THE INVENTION

The present invention relates generally to an interactive communication system, and more particularly to a method, system, and medium for providing a data construct that is used to describe an interactive communication session.

BACKGROUND OF THE INVENTION

The conventional telephony network allows users to communicate with each other through a central system of switches, which can be referred to as telephone exchanges. The telephone exchanges provide electrical or optical switches to connect users and allow communication. The conventional telephony network is often referred to as a public switched telephone network (PSTN). The switches and other equipment necessary to make a connection can be located, for example, in central offices (COs) and in customer premises. The PSTN can have local exchanges that allow a user to call another user of the PSTN through COs of the local exchange. The PSTN can also have long lines that allow long distance call transmission, such that a user can call another user on the PSTN that is not part of the local exchange. In this case, the call may be routed through multiple COs until the call reaches the called party's local exchange.

In recent years, Voice over Internet Protocol (VoIP) has provided an alternative to conventional telephone exchanges. VoIP employs the routing of voice conversations over the Internet or other IP-based networks. VoIP is a technology that allows a user to make telephone calls using a network connection instead of a traditional (analog) phone line connection. VoIP converts the voice signal from a telephone or a computer into a digital signal that is packetized over a network then converts it back at the other end so that a user can speak to anyone with a regular phone number or anyone who also uses VoIP technology. VoIP uses the network as the transmission medium for telephone calls by sending voice data in packets using IP rather than sending a voice signal over the PSTN.

Currently, a great deal of information concerning a telephone call is not correlated or stored together. This creates the inconvenience of having to supply or store the same information multiple times. For example, when a user calls a credit card company, the automated service asks the user to enter the user's credit card number and other information that identifies the user and the service that the user wants. However, once a user decides to speak to a customer representative, the user needs to repeat to the customer representative much of the information that was previously entered using the automated service, such as the credit card number. The problem of repeatedly providing the same information also occurs when calls are transferred between different departments or enterprises. For example, a user may call a brokerage house to inquire a specific investment product offered through the brokerage house, and the brokerage house transfers the call to an investment company who offers the investment product. Whatever information the user provides the brokerage house, the user needs to repeat again with the investment company as the investment company cannot have access to the brokerage house's records where the information is stored.

SUMMARY OF THE INVENTION

Some embodiments of the present invention provide a method and system for correlating information regarding an interactive communication session. A session application record is provided to store information of a session that represents an interactive communication, such as a telephone call, a chat session, an on-line multimedia conference, that is between at least two endpoints. An application programming interface (API) is provided for users to create and manipulate session application records. Application specific data or customized data can be stored with the session application record using a tag that includes a name and an optional value. One session application record can be associated with another session application record by using a relation. Any information that is gathered during a session can be accessible even when one of the endpoints in the session is replaced by another endpoint.

In one embodiment of the present invention, a method of correlating data with an interactive communication is provided. The method includes creating a first session representing an interactive communication including a first endpoint and a second endpoint; creating a first session application record (SAR) recording data related to the first session; terminating the first session; and storing the first session application record.

In one aspect of the present invention, the creation of the first session application record is before the creation of the first session. The first session application record may include at least one of an identification number, a session start time, a session end time, a session status, a controller component identification number, a completion status, and a revision number. In a further aspect of the present invention, the method further includes creating a first endpoint record (EPR) for the first endpoint; and creating a second endpoint record for the second endpoint, wherein the first endpoint record and the second endpoint record associates with the first session application record. Each endpoint record may include at least one of an identification number, a uniform resource identifier, a status flag, a session join time, a session leave time, a completion status, an identification number of an endpoint record that it is replacing, an identification number of an endpoint record that it is replaced by, and an identification number of the associated session application record. In another aspect of the present invention, the method further includes storing the first endpoint record and the second endpoint record. The method may further include the step of creating a tag for the first session application record, where the tag includes a name and an optional value. In another aspect of the present invention, the method may further include the step of creating a relation between the first session application record and a second session application record, wherein the second session application record includes data related to a second session. The second session may include the first endpoint, the second endpoint, or completely different endpoints from the first session. A tag may be created for the relation. In yet another aspect of the present invention, the method also includes querying for information in the first session application record.

In still another aspect of the present invention, the method further includes the step of replacing the first endpoint with a third endpoint; providing data stored in the first session application record to the third endpoint; and storing communication information between the second endpoint and the third endpoint in the first session application record. The method may also include the step of creating a third endpoint record for the third endpoint including information identifying which endpoint was replaced by the third endpoint. The information identifying which endpoint was replaced can include an identification number of the first endpoint record for the first endpoint. The first endpoint record for the first endpoint may include information identifying the third endpoint that replaces the first endpoint. The information identifying the third endpoint can include an identification number of the third endpoint record for the third endpoint.

In another embodiment of the present invention, a system for correlating data with an interactive communication is provided. The system includes an application programming interface for creating a session that represents an interactive communication including a first endpoint and a second endpoint, and a session application record that stores information of the session, wherein the session application record still exists after the session is terminated. In one aspect of the present invention, the application programming interface manipulates the session application record. In another aspect of the present invention, the application programming interface is used to create at least one of an endpoint record, a relation, a relation type, a tag to store information associated with the session with the session application record.

In yet another embodiment of the present invention, a medium storing computer-executable instructions for a method of correlating data with an interactive communication is provided, where the method includes creating a first session representing an interactive communication including a first endpoint and a second endpoint; creating a first session application record recording data related to the first session; terminating the first session; and storing the first session application record.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Some embodiments of the present invention provide a method and system for correlating information regarding an interactive communication session. A session application record is provided to store information of a session that represents an interactive communication, such as a telephone call, a chat session, an on-line multimedia conference, that is between at least two endpoints. An application programming interface (API) is provided for users to create and manipulate session application records. Application specific data or customized data can be stored with the session application record using a tag that includes a name and an optional value. One session application record can be associated with another session application record by using a relation. Any information that is gathered during a session can be accessible even when one of the endpoints in the session is replaced by another endpoint.

Figure 1:
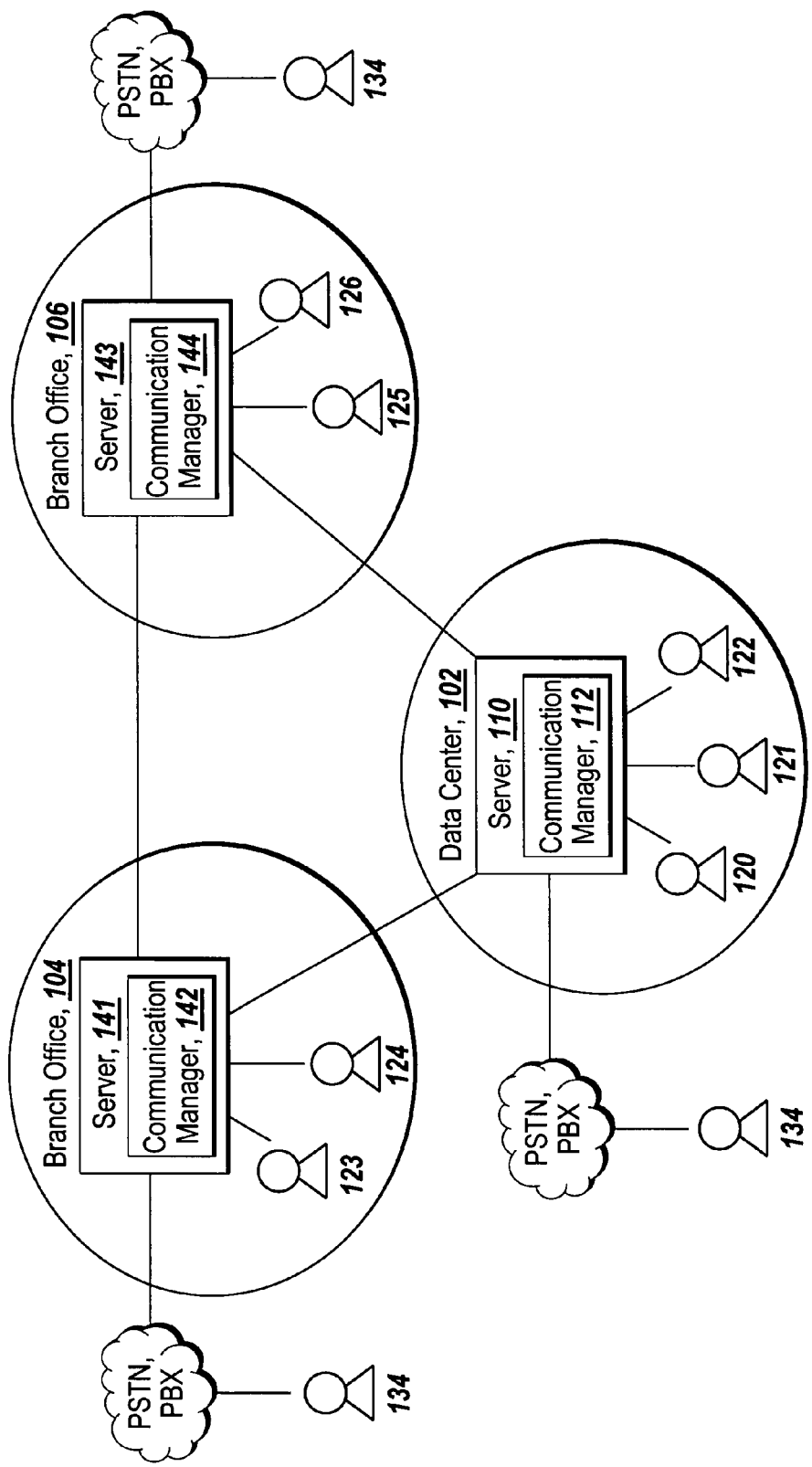
FIG. 1 illustrates an exemplary VoIP network that is suitable to practice one embodiment of the present invention.

FIG. 1 depicts an exemplary VoIP network 100 that can be implemented in accordance with the present invention. The VoIP network 100 includes a data center 102, a branch office 104 and a branch office 106.

One skilled in the art will recognize that the VoIP network 100 is merely an illustrative example and that a myriad of different configurations can be formed within the scope of the present invention. Further, it will be recognized by one skilled in the art that the VoIP network can be configured without branch offices or without a data center or the VoIP network 100 can include multiple data centers. The protocol used in the VoIP network can include, but not limited to, Session Initiation Protocol (SIP), H.323, Skype, Jingle, Inter-Asterisk eXchange (IAX), SCCP (Skinny Client Control Protocol).

Communication endpoints 120-126 can include a computing device that can initiate and receive communication and can include a software based phone. The communication endpoints can also include a SIP phone, a cellular phone, a PDA, a laptop, a desktop, or any other device that is capable of receiving and/or originating a voice call in a VoIP network.

The data center 102 includes a server 110 with a communication manager program 112 that is loaded on the server 110, a communication endpoint 120, a communication endpoint 121 and a communication endpoint 122. The server 110 is connected to each of the communication endpoints 120-122. The server 110 can also connect to the PSTN and a PBX.

The communication manager 112 is a computer program that controls communications among the communication endpoints 120-122 of the data center as well as between the communication endpoints of the data center and the branch office 104 or the branch office 106. The communication manager 112, for example, allows the communication endpoint 120 to establish communication with the communication endpoint 121. The communication manager 112 also enables the communication endpoints 120-122 to communicate with endpoints that employ phones on the PSTN and a PBX. The communication manager can, for example, allow the communication endpoint 120 to communicate with an endpoint 134 that uses a phone on the PSTN or a PBX. An example of the communication manager 112 is SESSIONSUITE™ from BlueNote Networks, Inc. of Tewksbury, Mass.

The branch office 104 includes a server 141 with a communication manager program 142, and the branch office 106 includes a server 143 with a communication manager program 144. The communication managers 142 and 144 can provide identical functionality as the communication manager 112. The branch office 104 includes a communication endpoint 123 and a communication endpoint 124. The branch office 106 includes a communication endpoint 125 and a communication endpoint 126. The data center, the branch offices 104, and the branch office 106 can be connected using a virtual private network (VPN).

The data center 102, the branch office 104 and the branch office 106 can each have multiple servers, where each server includes a communication manager. For example, each of the data center 102, the branch office 104 and the branch office 106 can include a second sever with a second communication manager to manage communications. The multiple communication managers can provide multiple routing paths for communications via the VoIP network and can also increase the number of communications each of the data center 102, the branch office 104 and the branch office 106 can manage.

The communication endpoint 122 of the data center 102 can communicate with the communication endpoint 124 of the branch office 104 or with the communication endpoint 125 of the branch office 106 by initiating a communication request that is processed by the communication manager 112, which sends the communication request to the communication manager 142 or 144, which in turn, processes the communication request and sends it to the communication endpoint 124 or 125, respectively. The communication managers 142 and 144 also allow the communication endpoints 124 and 125 to communicate with endpoint 134 that has a user using a phone on the PSTN or a PBX for communication.

Figure 2:
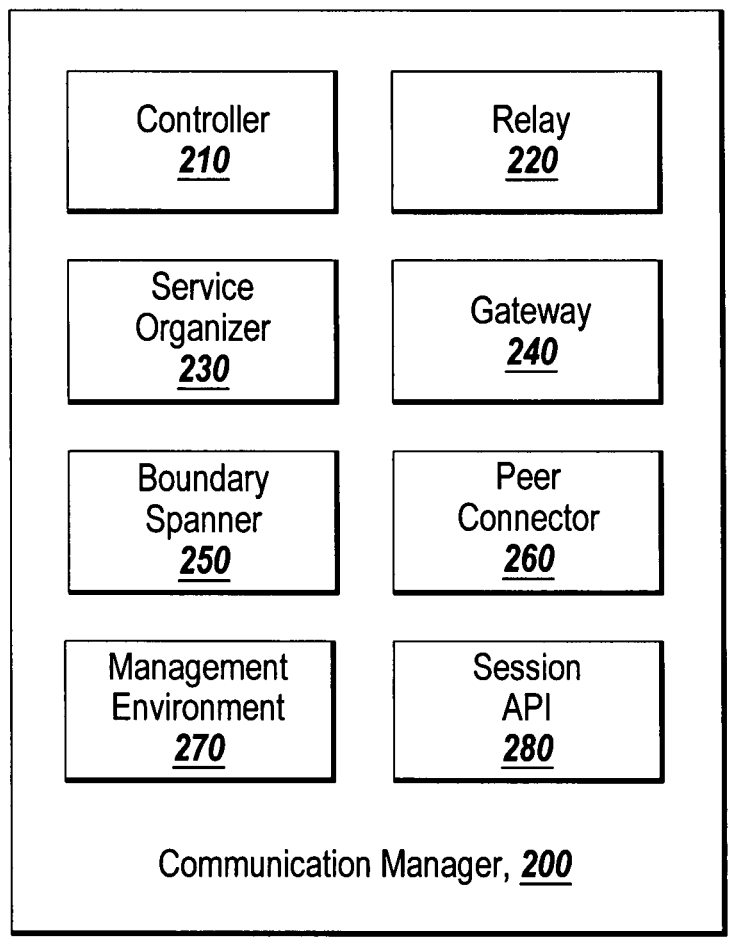
FIG. 2 illustrates the details of the call mangers of FIG. 1 in more detail in accordance with one embodiment of the present invention.

FIG. 2 depicts the communication managers 112, 142 and 144 in more detail. For clarity, unless otherwise stated, the communication managers 112, 142 and 144 will hereinafter be commonly referred to as communication manager 200. The communication manager 200 includes a controller 210, a relay 220, a service organizer 230, a gateway 240, a boundary spanner 250, a peer connector 260, a management environment 270, and a session API (application programming interface) 280. An example of the communication manager 200 can be SESSIONSUITE™ from BlueNote Networks, Inc. of Tewksbury, Mass.

The controller 210 supplies fundamental session initiation protocol (SIP) capabilities including, but is not limited to SIP Proxy, SIP Redirector, and SIP Registrar functions. The controller 210 can be RFC 3261 compliant and can provide a standards-based core signaling and control infrastructure. The controller 210 provides advanced admission control capabilities allowing VoIP calls to be rejected if insufficient resources are available to complete a call with acceptable quality and can integrate directly with enterprise information technology (IT) infrastructure such as RADIUS AAA servers and LDAP policy servers, thereby, allowing voice to be treated and managed in a manner similar to other IP applications.

The service organizer 230 can be used in conjunction with the controller 210 and provides traditional voice calling and point-to-point video features as a pure software solution. The service organizer 230 can deliver popular PBX calling functions along with value-added features such as voicemail, conference bridging, and Interactive Voice Response (IVR) and works with a wide variety of standards-based soft phones, SIP phones, and traditional analog telephones.

The gateway 240 bridges VoIP networks and traditional PSTN/PBX infrastructures, allowing VoIP users to communicate with PBX users or users of the PSTN network. The gateway 240 works with standards-based third party analog and digital line adapters, and supports a variety of interfaces including T1 CAS, ISDN PRI, and analog FXS/FXO.

The boundary spanner 250 delivers flexible and integrated boundary solutions for NAT and firewall traversal. Modern enterprise networks are comprised of independent networks with unique address spaces. NAT devices are used to connect with external networks, while firewall technology is used to protect the local network from the outside world. The boundary spanner 250 can enable SIP-controlled communications flows through firewall and NAT boundaries. The boundary spanner 250 can be used to extend corporate voice services to Internet-enabled mobile workers, or Internet-connected affiliates of an enterprise such as subsidiaries and suppliers.

The peer connector 260 provides connectivity and interoperability with external services, service providers and hosting facilities. The peer connector 260 can traverse firewalls and NAT devices that separate a service provider from a service subscriber. The peer connector 260 can provide additional naming and can identify features that allow enterprises to gain access to, use and manage external services.

The management environment 270 can be a Web-based application that manages the communication manager 20 as well as services, resources, sessions, users and clients of the VoIP network 100. The management environment 270 can provide a common Web browser interface for managing all of the software components of the communication manager, and offers integrated fault, configuration, performance and security management for all the communication manager 200 functions. The management environment 270 can provide a user portal that allows subscribers of the services 230 to manage call handling and voicemail features through a secure Web browser. The management environment 270 can provide an XML/SOAP interface for integration with third-party or customer-developed management applications and networks.

The relay 220 provides voice and video traffic forwarding and switching under the control of the controller 210. The relay 220 can supply compression and transcoding and can support a variety of CODECs including, but not limited to G.711 variants, G.729 variants, and GSM for voice; and H.263 and H.264 for video.

The session API 280 enable users to use their applications or build their own applications to utilize features and functionalities provided by the session API 280. The session API 280 provides means to manipulate sessions and associated data. A session is used herein to refer to an interactive communication set up between at least two endpoints. The session API 280 provides a list of functions that enable users to associate and store communication information with the session.

One of ordinary skill in the art will appreciate that one or more of the controller 210, relay 220, service organizer 230, gateway 240, boundary spanner 250, peer connector 260, management environment 270, and session API 280 can be stand-alone applications that can receive and answer calls from communication manager 200 instead of being part of the communication manager 200. Additionally, the functionalities of controller 210, relay 220, service organizer 230, gateway 240, boundary spanner 250, peer connector 260, management environment 270, and session API 280 can be combined into one component or organized into different components, any one of which may or may not be a part of communication manager 200.

Figure 3:
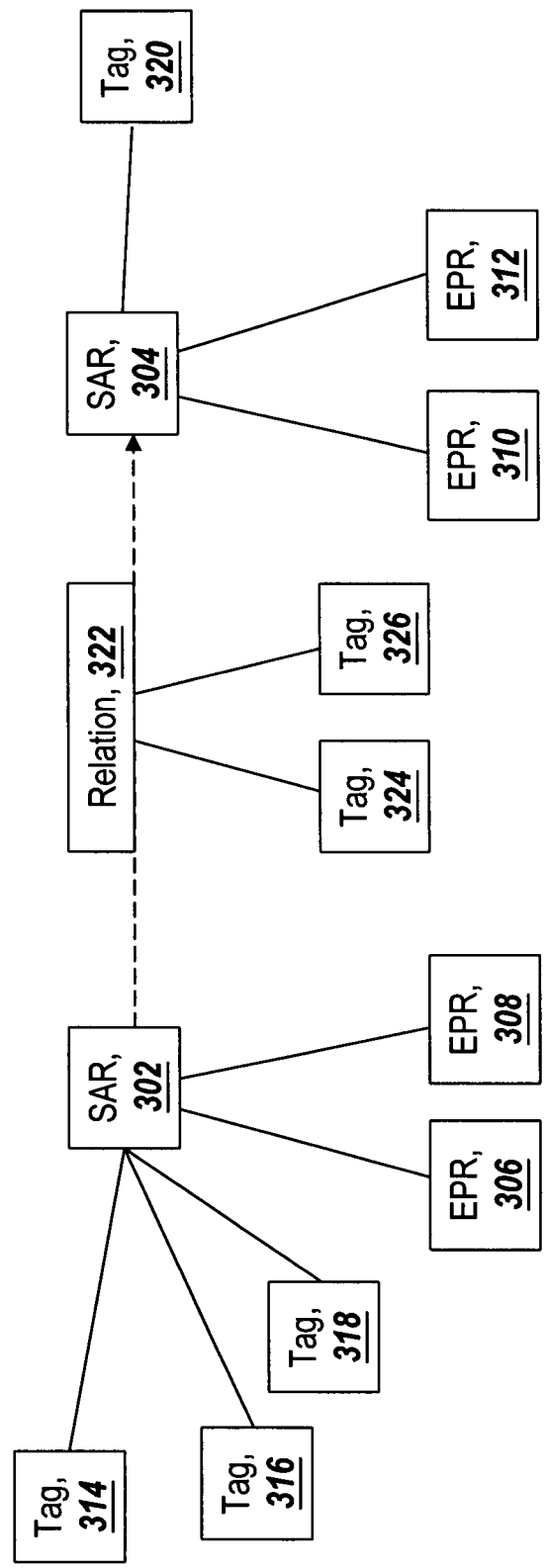
FIG. 3 illustrates the relationship between session application records, endpoint records, relations, and tags in accordance with one embodiment of the present invention.

FIG. 3 illustrates the different components that store information of an interactive communication. A session application record (SAR) is created whenever a session is created. In other words, a unique SAR is created for each interactive communication. FIG. 3 shows SAR 302 and SAR 304. Each SAR preferably has a unique identification number so that the identification number can be used later for accessing data in the corresponding SAR. In one embodiment of the present invention, the unique identification number is generated base on a database sequence. Each SAR can be stored in a database for later access. Although each SAR is associated with a session, the life cycle of the SAR is not terminated when the session is terminated. In one embodiment of the present invention, a SAR can be created for an underlying session that is schedule to exist some time in the future. Besides an identification number, each SAR can also contain a current session status, such as connected, complete, or B side ringing (i.e. phone at second endpoint side ringing). Each SAR can also contain other information that includes, but is not limited to, a session start time, a session end time, a controller component identification number, completion status (e.g. failure due to busy signal), and a revision number.

Figure 5:
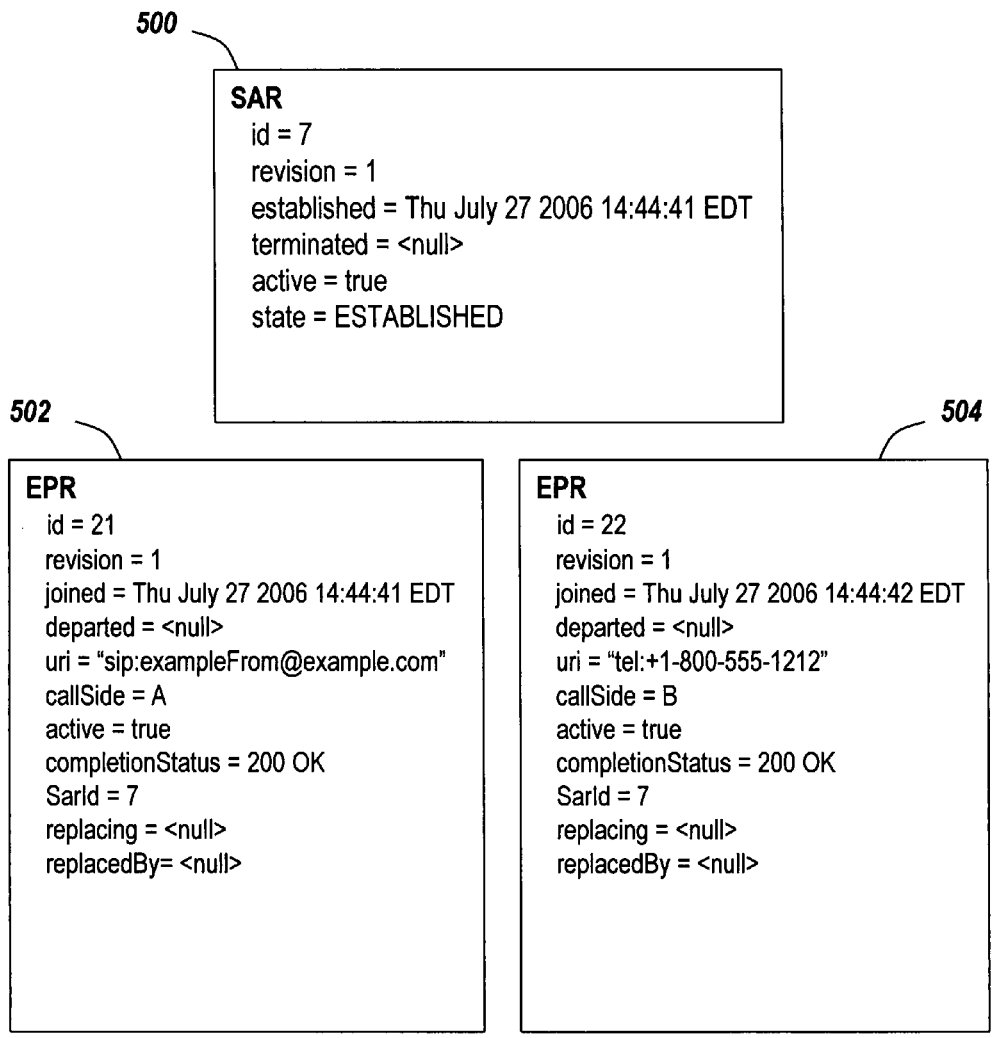
FIG. 5 illustrates an exemplary session application record and two exemplary endpoint records in accordance with one embodiment of the present invention.

FIG. 5 illustrates an exemplary SAR in accordance with one embodiment of the present invention. SAR 500 includes a identification number "7", a revision number "1", a session established time "Thu Jul. 27 2006 14:44:41 EDT", a session end time "null", a session status "true", a current call state "ESTABLISHED". SAR 500 has a session end time as "null" when the corresponding underlying session has not been terminated. Once the session is terminated, there is a time value in the session end time.

An endpoint records (EPR) is used in addition to SAR to store data related to a session. Each EPR represents an endpoint/party in a session. Therefore each SAR has at least two EPRs where one is associated with original side A (communication initiator) and the other is associated with original side B (communication receiver). Referring back to FIG. 3, SAR 302 has associated EPR 306 and EPR 308 while SAR 304 has associated EPR 310 and EPR 312. Each EPR has a 1:1 relationship with a SAR that is associated with the session that the EPR is or was a part of. Hence, a new EPR is created each time an endpoint is involved in a session. Each EPR preferably has a unique identification number so that the identification number can be used later for identification. In one embodiment of the present invention, the identification number can be generated base on a database sequence. An EPR may have an association with another EPR if one is replaced by another during the life time of a session. Each EPR may have other data other than the identification number, such as uniform resource identifier (URI), a flag indicating whether the corresponding endpoint is currently joined in session, the time the endpoint joins the underlying session, the time the endpoint leaves the underlying session, a completion status, the identification number of the EPR that it is replacing, the identification number of the EPR that it is replaced by, and the identification number of the associated session application record.

FIG. 5 illustrates two EPRs in accordance with one embodiment of the present invention. EPR 502 and EPR 504 are associated with SAR 500. EPR 502 has a different identification number than EPR 504. Both EPR 502 and EPR 504 have the same SAR identification number information that corresponds to the identification number of SAR 500. EPR 502 is created for a SIP user that has the unified resource identifier as exampleFrom@example.com where as EPR 504 is created for a traditional PSTN user that has the unified resource identifier as 1-800-555-1212. In a preferred embodiment of the present invention, each unified resource identifier includes a type of the unified resource identifier. As seen in FIG. 5, EPR 502 has a unified resource identifier that is proceeded by a prefix "sip:" and EPR 504 has an unified resource identifier that is proceeded by a prefix "tel:", where the prefix provides a type of the unified resource identifier. EPR 502 has a designation as the A side, which is normally the endpoint that initiates communication while EPR 504 has a designation as the B side, which is normally the endpoint that receives communication. Both EPR 502 and EPR 504 also contain other information, such as session join time, session depart time, current status, completion status, and revision number.

A relation can be created to associate two SARs, where one is designated as the "from" side of the relation and the other is designated as the "to" side of the relation. FIG. 3 shows that SAR 302 has a relation 322 with SAR 304, where SAR 302 is at the "from" side and SAR 304 is at the "to" side of relation 322. Each relation has a unique identification number for itself, and includes the identification numbers of the two associated SARs. In one preferred embodiment of the present invention, each relation has a relation type. Each relation type may also have an identification number for identification. Each SAR, EPR, relation, relation type can be created by a function call via the session API 280. Each SAR, EPR, relation, relation type can be stored in a database and be implemented using, for example, a data object, an object implemented using a object-oriented programming language, an XML document, a row of data in a relational database. One of ordinary skill in the art will appreciate that there are many ways that one can implement a SAR, EPR, relation, relation type, and the specific examples listed herein is not meant to limit the scope of the present invention.

Application data or application-specific semantics can be stored together with a session by using a tag. A tag can include data to tag with any entity, such as a SAR, a relation, relation type, or an EPR. FIG. 3 shows that SAR 302 has tags 314, 316, 318, and SAR 304 has tags 310 and 312. Relation 322 is shown to have two tags, tag 324 and tag 326. Each tag includes a name and optionally a corresponding value. The name part of the tag is preferably a text identifier that can be used to query whereas the value part of the tag can be in any suitable format for a specific application. For example, a tag can have, but is not limited to, the following format: plain text, numeric data, binary data, structured XML data, and uniform resource identifier. The tagging mechanism provides users and applications a way to tag entities, such as SAR, EPR, or a relation. The users can later query on the tags using the tag name fields. For example, an application may tag some sessions with a specific tag name "NeedsFollowUp" so that the application can query all the sessions later on with a tag that has the name "NeedsFollowUp". The contents in the value fields of the tags can include additional information which can be retrieved by queries using the session API 280. Each tag is stored together with the associated SAR. SARs, EPRs, relations, relation types, and tags can be stored in data center 102 or a database elsewhere. To retrieve information stored in a SAR, EPR, relation, relation type, or tag, one can query using the session API 280 to obtain the necessary information.

The present invention solves the prior art problem of having to repeat information in an interactive communication, such as a telephone call. Using the present invention, a customer representative or automated service can use session API 280 to create tags in the corresponding SAR to store information that is provided by a customer. Any customer representative that helps out the customer can use queries provided by the session API 280 to obtain all the information that is gathered so far from the customer in this telephone call or in other previous related telephone call(s). In the case where two different enterprises that share access to SARs in a database, the enterprise that receive transferred calls from the other enterprise will also be able to obtain all the information that is gathered so far in the transferred call by the other enterprise.

Since the present invention provides an API for manipulating sessions and not a specific user interface, users can choose how to integrate the present invention into their existing applications and telephone systems, regardless of their existing telephone systems being either the traditional systems that use the PSTN or the new systems that use the VoIP technology or a combination of both.

Figure 4:
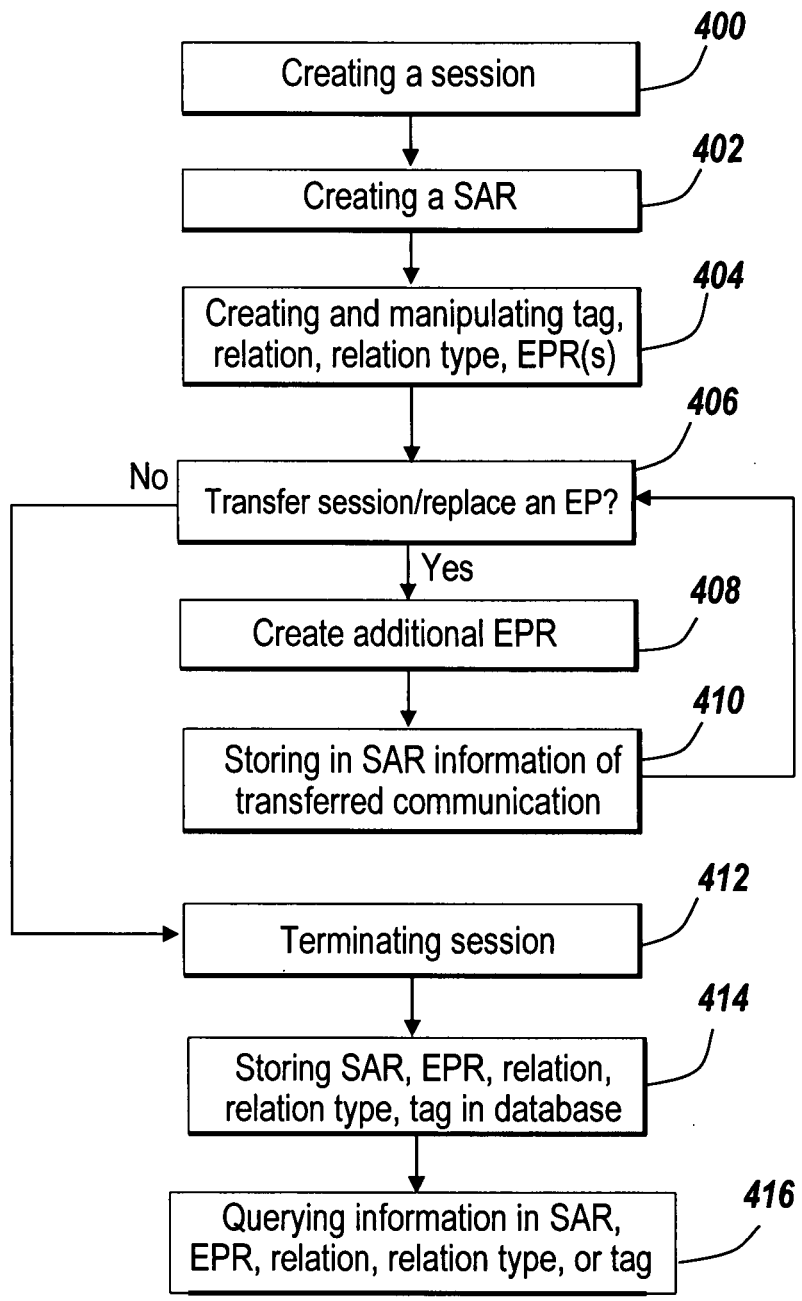
FIG. 4 illustrates a flowchart depicting the steps taken to practice one embodiment of the present invention.

FIG. 4 illustrates a flowchart depicting steps taken to practice one embodiment of the present invention. In step 400, a session initiating an interactive communication including a first endpoint and a second endpoint is created. A corresponding SAR is created in step 402 to record data related to the session. In one embodiment of the present invention, the SAR can be created for a future session. Each SAR may include at least one of an identification number, a session start time, a session end time, a session status, a controller component identification number, a completion status, a revision number. In step 404, one or more tag, relation, relation type, EPR that associates with the SAR can be created and manipulated. Each EPR may includes at least one of an identification number, a uniform resource identifier, a status flag, a session join time, a session leave time, a completion status, an identification number of an endpoint record that it is replacing, an identification number of an endpoint record that it is replaced by, and an identification number of the associated SAR. A tag can be created to tag along a SAR, an EPR, a relation, or a relation type. Each tag preferably includes a name/value pair. A relation can be created to associate the current session with another session. A relation type can be used in the relation to show the kind of relation the two sessions have.

In step 406, if an endpoint is being replaced or the communication needs to be transferred, then additional EPR is created in step 408 for each new endpoint that joins the session. Any communication information that involved the new endpoint(s) is stored in the same SAR in step 410. Once the communication with the new endpoint(s) has ended, then communication manager 200 see if the communication needs to be further transferred or if any of the endpoints need to be replaced in step 406. In step 406, if there is no request for a transfer or no request for further replacement of an endpoint, then the session can be terminated in step 412. In step 414, the SAR and any associated EPRs, relation(s), relation type(s), tag(s) are stored. In one embodiment of the present invention, every time information in a SAR, EPR, relation, relation type, or tag is changed during the session, the SAR, EPR, relation, relation type, or tag is saved. The revision number in SAR can be updated to reflect that there was a change since the last version. Information in the SAR, EPR, relation, relation type, or tag can be queried through session API 280 in step 316. In one embodiment of the present invention, a user or application may want to perform the query before the termination of the session, such as after a call is transferred, so that the new party that joins the session can be informed of what information has been gathered in the session before the new party joins.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

We claim:

1. A method of correlating data with an interactive communication, said method comprising:
   creating a first session representing an interactive communication including a first endpoint and a second endpoint;
   creating a first session application record having a unique identification number, a current session status indicator, and data related to the first session and which is retained after the first session is terminated;
   creating a first endpoint record representing the first endpoint, having a unique identification number a flag indicating whether the first end point is currently joined in the first session, a designation of association with one of a communication initiator and a communication receiver, and data related to the first endpoint;
   creating a second endpoint record for the second endpoint, wherein the first endpoint record and the second endpoint record associates with the first session application record;
   creating a tag associated with the first session application record having a text identifier and storing application specific semantics and information provided by a customer;
   terminating the first session; and
   storing the first session application record and the tag, and accessing the session application record and tag after the first session is terminated.

2. The method of claim 1, wherein the creation of the first session application record is before the creation of the first session.

3. The method of claim 1, wherein the first session application record includes at least one of an identification number, a session start time, a session end time, a session status, a controller component identification number, a completion status, and a revision number.

4. The method of claim 1, wherein the first endpoint record and the second endpoint record include at least one of a uniform resource identifier, a status flag, a session join time, a session leave time, a completion status, an identification number of an endpoint record that the first endpoint or the second endpoint is replacing, an identification number of an endpoint record that the first endpoint or the second endpoint is replaced by.

5. The method of claim 1, further comprising:
   storing the first endpoint record and the second endpoint record and creating a third endpoint record if one of the endpoints needs to be replaced.

6. The method of claim 1, further comprising:
   querying the tag using the text identifier.

7. The method of claim 6, wherein the tag includes customer information retrieved by queries using a session application programming interface.

8. The method of claim 1, further comprising:
   creating a relation record associating the first session application record with a second session application record, each relation record having a unique identification number and including the unique identification number of the first and second session application records and a relation type identifier wherein the second session application record includes data related to a second session.

9. The method of claim 8, further comprising:
   creating a tag for the relation.

10. The method of claim 1, further comprising:
    querying for information in the first session application record and in the tag using the unique identification number and the text identifier.

11. The method of claim 1, further comprising:
    replacing the first endpoint with a third endpoint;
    providing data stored in the first session application record to the third endpoint; and
    storing communication information between the second endpoint and the third endpoint in the first session application record.

12. The method of claim 11, further comprising:
    creating a third endpoint record for the third endpoint including information identifying which endpoint was replaced by the third endpoint.

13. The method of claim 12, wherein the information identifying which endpoint was replaced includes an identification number of the first endpoint record of the first endpoint.

14. The method of claim 13, wherein the endpoint record for the first endpoint includes information identifying the third endpoint that replaces the first endpoint.

15. The method of claim 14, wherein the information identifying the third endpoint includes an identification number of the third endpoint record for the third endpoint.

16. A system for correlating data with an interactive communication, said system comprising:

a processor having an application programming interface for creating a session that represents an interactive communication including a first endpoint and a second endpoint, and a session application record having a unique identifier and a current session status indicator that stores in a memory information of the session including an associated tag having a text identifier and application specific semantics including information provided by a customer, and including creating a first endpoint record representing the first endpoint, having a unique identification number, a flag indicating whether the first end point is currently joined in the first session, a designation of association with one of a communication initiator and a communication receiver, and data related to the first endpoint, and creating a second endpoint record for the second endpoint;

wherein the first endpoint record and the second endpoint record associates with the first session application record, and wherein the session application record still exists after the session is terminated, and for accessing the session application record and tag after at least one of the endpoint is terminated.

17. The system of claim 16, wherein the application programming interface manipulates the session application record.

18. The system of claim 16, wherein the application programming interface is used to create at least one of an endpoint record, a relation, a relation type, and a tag to store information associated with the session with the session application record and to query the tag using the text identifier.

19. A non-transitory medium storing computer-executable instructions for a method of correlating data with an interactive communication, said method comprising:

creating a first session representing a communication including a first endpoint and a second endpoint;

creating a first session application record having a unique identifier, a current session status indicator, and data related to the first session;

creating a first endpoint record representing the first endpoint, having a unique identification number, a flag indicating whether the first end point is currently joined in the first session, a designation of association with one of a communication initiator and a communication receiver, and data related to the first endpoint;

creating a second endpoint record for the second endpoint, wherein the first endpoint record and the second endpoint record associates with the first session application record;

creating a tag associated with the first session application record having a text identifier and application specific semantics including information provided by the customer;

terminating the first session; and storing the first session application record and the tag.

* * * * *